United States Patent [19]
Hahn et al.

[11] Patent Number: 5,716,158
[45] Date of Patent: Feb. 10, 1998

[54] EXPANDABLE BELT TYPE EXPANSION JOINT

[75] Inventors: Robert B. Hahn; Kim M. Massey, both of Virginia Beach; Hamid Sayar; Ann C. Van Orden, both of Norfolk, all of Va.

[73] Assignee: The Atlantic Group, Inc., Norfolk, Va.

[21] Appl. No.: 701,330

[22] Filed: Aug. 23, 1996

[51] Int. Cl.$^6$ ............................................. F16B 5/00
[52] U.S. Cl. .................. 403/291; 403/28; 403/404; 52/393; 285/187; 285/229
[58] Field of Search .................. 403/291, 28, 29, 403/30, 50, 24, 404; 285/187, 229; 198/844.1, 844.2, 847; 404/65, 69; 52/393, 573.1

[56] References Cited

U.S. PATENT DOCUMENTS

| | | | |
|---|---|---|---|
| 2,712,456 | 7/1955 | McCreery | 285/187 X |
| 3,368,835 | 2/1968 | Hackforth | 403/50 |
| 3,552,776 | 1/1971 | Leymann | 285/229 X |
| 4,186,949 | 2/1980 | Bartha et al. | 285/229 X |
| 4,289,338 | 9/1981 | Cook | 285/229 |
| 4,345,772 | 8/1982 | Woody et al. | 403/50 X |
| 4,732,413 | 3/1988 | Bachmann et al. | 285/49 |
| 5,159,811 | 11/1992 | Hefler et al. | 285/187 X |
| 5,228,255 | 7/1993 | Hahn | 404/65 X |

FOREIGN PATENT DOCUMENTS

| | | | |
|---|---|---|---|
| 2488674 | 2/1982 | France | 285/187 |
| 1253532 | 11/1967 | Germany | 285/229 |
| 3034742 | 4/1982 | Germany | 285/229 |

*Primary Examiner*—Harry C. Kim
*Attorney, Agent, or Firm*—Fitzpatrick, Cella, Harper & Scinto

[57] ABSTRACT

A novel S-shape web section in a dog bone style expansion joint belt, having a very significant increase in the ability to define a successful seal even in misaligned or otherwise off-specification expansion joint environments. The web section has the potential of significantly increasing belt service life in contrast to a conventional OEM belt, due to lower stress levels at finite element locations proximate to the mid-span, and particularly on the convex inner surface of the belt during high vacuum situations. The web preferably has only 3 layers of polyester or nylon fabric, each with an intermediate skim coat of neoprene rubber, to bond the fabric plies together and also to bond the fabric core with an outer covering of black neoprene rubber or Viton rubber. The fabric plies may extend longitudinally inside of the end knobs or be splayed outwardly inside of each end knob to avoid need for a separate cord or a cord and a key.

10 Claims, 4 Drawing Sheets

(VIEW A-A)

*FIG. 2*
(VIEW A-A)

| DIST. | STRESS IN C SHAPE | STRESS IN S SHAPE |
|---|---|---|
| 0.2727 | 0.1754 | 0.0854 |
| 0.8181 | 0.2748 | 0.1907 |
| 1.3636 | 0.4272 | 0.2748 |
| 1.9091 | 0.5568 | 0.3737 |
| 2.4545 | 0.6712 | 0.4157 |
| 3 | 0.7704 | 0.46 |
| 3.5454 | 0.8391 | 0.4157 |
| 4.0909 | 0.9077 | 0.3737 |
| 4.6363 | 0.9887 | 0.2746 |
| 5.1818 | 0.9916 | 0.1907 |
| 5.7272 | 1 | 0.0854 |
| 6.2727 | 0.9916 | 0.0854 |
| 6.8182 | 0.9687 | 0.1907 |
| 7.3636 | 0.9077 | 0.2748 |
| 7.9091 | 0.8391 | 0.3737 |
| 8.4545 | 0.7704 | 0.4157 |
| 9 | 0.8712 | 0.46 |
| 9.5454 | 0.5568 | 0.4157 |
| 10.0909 | 0.4272 | 0.3737 |
| 10.6363 | 0.2746 | 0.2746 |
| 11.1818 | 0.1754 | 0.1907 |
| 11.7272 | 0.084 | 0.0854 |

FIG. 6 (b)

EXPANDABLE BELT TYPE EXPANSION JOINT

BACKGROUND OF THE INVENTION

1. Field of the Invention

The present invention relates to different constructions for initial use, or replacement use, of the dog bone-style of fabric/rubber belts used with steam inlet expansion joints in power plants.

2. Brief Description of the Prior Art

Flat web, dog bone-style belts conventionally are used to define an expansion space between the last stage of a steam turbine and the inlet of a condenser, in a power plant. A first substantially rectangular clamping expansion joint element is field welded transversely to a rectangular duct leading from a steam turbine outlet. The rectangular dimensions are typically approximately 20 linear feet on each of the four sides, with 12 inch radiused corners between sides. A second substantially rectangular clamping expansion joint element then is welded transversely to a matching duct leading to the condenser inlet. The longitudinal clamp spacing is typically about 10 inches. Both longitudinal clamp spacing and transverse clamp spacing alignment are critical dimensions. The beads or knobs at each end of dog bone-style belts fit in a raceway around each joint, and the web is held substantially elongated in the longitudinal direction by clamping bars on each opposed expansion joint element. Further construction details of conventional dog bone-style expansion joints and clamping bars are shown in HAHN (U.S. Pat. No. 5,228,255), which is incorporated herein by reference for that purpose. Hereafter, such flat web, dog bone-style belts as specified by expansion joint manufacturers for mounting between the last stage of a steam turbine and the inlet of a condenser in a power plant will also be referred to as original equipment manufacturer belts, or OEM belts.

The belt interior surface is subjected to saturated steam at vacuum conditions typically between 1 and 5 inches Hg absolute and at temperatures typically between 100° and 130° F. The belts also are subject to short duration temperature spikes approaching 250° F. The present invention is a response to the problem of very difficult installability for OEM belts in expansion joint environments which are off-specification, for example because the ducts to be joined are slightly off-axis or otherwise skewed, or an installer had improperly welded the opposed clamping bars onto the ducts. The present invention also is a response to the desire to maintain or increase the high life-cycle and related performance efficiencies required for OEM belts by designers of expansion joints, when a belt has to be replaced quickly and perfectly during a shut-down time dictated by the operator of a power plant. The present invention permits simpler and more fool-proof installation of a new or a replacement belt, using a new belt configuration that is more flexible than the OEM belt being replaced, but still does not compromise the long service life demanded by expansion joint manufacturers and power plant operators alike. It was a specific goal of the present invention to define a belt for an expansion joint that was inherently more resistant to failure at the mid range of its longitudinal span, since early failure of OEM belts typically occurs at the mid-span region, due to an initial misalignment of damping bars and the flexure and temperature requirements imposed upon the mid span interior region during operating cycles. OEM belts also may be described having a dog bone, or dumbbell, shape in cross-section, with ⅜ inch or ⅝ inch thick web sections extending between 1¼ in. diameter knobs at each end. Cord cores, often with a key made of a material such as polyethylene, typically are used to define the knobs at each end. A minimum of 6 plies of fabric, usually nylon or polyester, forms the central web carcass of the belt with distal ends of the fabric wrapped around the cords used to define the knobs. A laid-up, web and core end carcass then conventionaly is encased by a single overmolding step using an elastomer, such as neoprene rubber, chlorobutyl rubber or Viton (a copolymer of hexafluoropropylene and vinilidene flouride). Further common belt-type expansion joint materials are shown in COOK (U.S. Pat. No. 4,289,338), which is incorporated herein by reference for that purpose.

Under typical expansion joint design specifications, the clamping bars must tightly seal around each knob, and the web must be designed to maintain a pressure differential of up to 15 psi., without collapsing inwardly. Unfortunately, the design service life of an OEM belt often is compromised and reduced due to inadequate flexibility in the flat web portion. Flexibility appears to be critical when there are slight to severe misalignments or variations in the clamping spacing around the periphery of an expansion joint. The clamping bars, which must be welded in the field, are seldom perfectly aligned. Moreover, the clamping space, i.e., the longitudinal space between the clamping bar raceways, is a critical dimension that dictates the size of the belt required. An OEM belt cannot be compressed more than 1 inch, and cannot be stretched more than ⅛ inch, and the clamping space often will vary from section to section around the expansion joint. Therefore, the OEM belt often must be forced-fitted into place using compression and stretching forces, during installation. Such initial conditions result in additional stresses, which predispose the belt to premature failure. Any longitudinal compression of an OEM belt will begin to induce the web portion to enter into a first mode of buckling, wherein the web defines a C-shape between the clamped knob ends. Further illustration of a C-shape, or first mode of buckling for a belt-type expansion joint is shown in BACHMANN et al. (U.S. Pat. No. 4,732,413), which is incorporated herein by reference for that purpose.

SUMMARY OF THE INVENTION

Tensile testing and fatigue testing initially were conducted on several samples intending to represent typical OEM belts and belts with certain modified design characteristics, according to principles of this invention. The design modifications were of three basic types. First, the initial shape of the web section of the belt was altered, where it extended longitudinally between the end knobs. Second, varying the number of fabric layers and the lay up of the fabric carcass was investigated. Third, the manner of integrating fabric with key or rope elements within the knobs was investigated.

The results of analytical studies, using tensile and fatigue tests as well as finite element computer modeling, suggested that the most critical variable related to a change of the initial shape of the web section from a planar member to a double-curve or "S-shape". Using a constant loading cycle of longitudinal compression and expansion, finite element analyses indicated that the novel S-shape web section for a dog bone style expansion joint as taught herein could reduce the maximum stress experienced in the web by 50%, in comparision to the maximum stress experienced in the flat web of an OEM belt. An OEM belt will assume a C-shape as its first buckling mode, upon compression. The S-shape web section as taught herein essentially creates a second and preferred buckling mode, that permits good cycle life despite more flexibility to the belt. The S-shape web section also greatly improves the flexing capability of the belt, which becomes critical when off-specification field conditions exist between the two clamping elements of an expansion joint. The S-shape web section as taught herein accomodates expansion joint clamp spacing that is out of specification up to about +1 inch and −1 inch in longitudinal spacing and also up to about +1 inch and −1 inch in transverse misalignment. OEM belts only will accommodate expansion joint clamp spacing that is out of specification less than about +⅛ inch and less than about −1 inch in longitudinal spacing and up to about +¼ inch or −¼ inch in transverse misalignment. More importantly, any out of specification dimensions impose serious initial stresses upon the mid span region of the web. It is well known that an OEM belt cannot really accommodate any amount of longitudinal extension, during or after installation. Hence, a well-known field requirement is that opposed surfaces of the expansion joint be welded with a clamp space no further apart than the design specification distance set for the OEM belt by the expansion joint manufacturer. A +⅛ inch excess in clamp spacing at any section of the joint is viewed as a serious out of specification field condition.

Finite element analyses and testing, using both tensile failure mode and high/low temperature cycle fatigue surface cracking protocols, revealed surprisingly improved flexibility and durability if certain internal web construction techniques were adopted. Particularly advantageous was a novel S-shape web section with fewer than the conventional 5 or 6 layers of polyester or nylon fabric being used to define a nominal ⅜ inch web thickness.

It also was found advantageous to first apply an intermediate neoprene rubber skim coat to the fabric (either before laying up each fabric ply or after the plies are laid up) and then overmolding with an outer covering, typically black neoprene or viton rubber, so as to define a nominal ⅜ inch web thickness. Such web constructions were found to add flexibility to the belt and also to improve the sealing capability of the belt, around the knob ends.

The S-shape taught herein comprises the same longitudinal dimensions of the OEM belt to be replaced, but with a curved, constant thickness web that initially is molded through use of two sets of radii of curvature. The first set preferably has a radius of 1⅛ inches and each is established from center points that are about 1⅛ inches longitudinally from the center point of the knob and about 1 9/16 inches transversely from the center line between the two end knobs. The center points for the two radii of curvature defining the first set are on opposite sides of the web. The second set preferably has a radius of 1½ inches and each is established from center points that are about 3 1/16 inches longitudinally from the center point of the knob and about 1 inch transversely from the center line between the two end knobs. The center points for the two radii of curvature defining the second set are on opposite sides of the web. The foregoing preferred dimensions are for a nominal ⅜ inch web dimension, and the stated dimensions refer to the locii of points defining the centers of curvature for the outer surface of the web facing each point of a center of curvature. With such dimensions, the web will be in an S-shape and longer in fact than the flat web in an OEM belt having the same, nominal longitudinal dimensions of 10⅛ inches overall, and 8⅞ inches between center points of the end knobs.

Tensile failure testing and high/low temperature cycle fatigue testing results also suggested two improved designs for knob configurations, whereby a conventional rope core and separate key element are replaced with alternate designs relying upon the fabric carcass to define a key function. In a typical OEM belt 6 fabric layers are together and parallel in the web section, and then the fabric layers are spread apart and wrapped around a rope inside of each knob end. A separate key element may also be positioned just below the rope as a transition to the flat web portion.

The first novel knob design involves continuation of the fabric plys as a web up to about ¼ inch from the outer surfaces of each knob. The second alternate knob design involves spreading the fabric layers transversely apart inside of each knob, so as to form a keyed section without a rope core. Both designs avoid the need to accurately locate a rope core and fabric interface inside of a knob when molding over the neoprene covering. The second novel knob design simply relies upon the splaying of three fabric layers to define a self-keying mechanism. Overall longitudinal and transverse flexibility of the belt in addition will be enhanced, without the presence of a rope core and a separate key. Residual stresses arising from installation of such a belt in off-specification clamping bars also will be more likely to self-relieve, without comprising the quality of the seal between the knob and the clamping device.

Tensile failure testing results were derived using prototype samples for each design alternative. Each sample was an approximately 6 inch section of a dog bone-style belt, with the belt having a longitudinal or length dimension of approximately 10 inches (between knob ends) and a transverse or web thickness dimension of ⅜ inches. Each of the sample embodiments of the invention revealed an ultimate tensile strength of at least 14,000 pounds before a failure in either a fabric-snapping mode or an unzipping mode, where the belt separated. The tensile strength of three layers of 7.5 ounce spun polyester fabric in such samples was estimated to have been approximately 12,500 pounds.

More importantly, fatigue cycle testing at high temperatures, such as 300° F., showed survival after 20,000 cycles using prototype samples for each design alternative, which approximates about 100 years of the cycling expected in a power plant. Fatigue cycle testing at more typical in-plant temperatures, such as 100° F., showed survival after 60,000 cycles. The fatigue testing cycle initially compressed the belt longitudinally 1 cm., then further compressed the belt to a 3 cm. total compression and then relaxed the belt back to its initial condition, using a cycle frequency of 1 Hertz.

Accordingly, a first object of the present invention is a novel S-shape web section in a dog bone style expansion joint belt, having a very significant increase in the ability to define a successful seal even in misaligned or otherwise off-specification expansion joint environments.

A second and related object of the present invention is a novel S-shape web section in a dog bone style expansion joint belt having specifications and dimensions which will significantly increase belt service life, as compared to a conventional OEM belt, due to lower stress levels at finite element locations proximate to the mid-span, and particularly on the convex inner surface of the belt during high vacuum situations.

A third and related object of the present invention is a novel S-shape web section in a dog bone style expansion joint belt having less than 5 or 6 plies of polyester or nylon fabric, wherein a skim coat of neoprene rubber is applied to both sides of each fabric ply to better bond the fabric core to an overmolded, outer covering of black neoprene rubber or Viton rubber.

A fourth and related object of the present invention is a novel S-shape web section in a dog bone style expansion joint belt, wherein distal ends of the fabric plies are splayed outwardly within an outer covering of neoprene rubber or Viton rubber, to define the end knobs.

A fifth and related object of the present invention is a novel S-shape web section in a dog bone style expansion joint, wherein the fabric plies extend longitudinally within the web and inside of the end knobs, with distal ends approximately ¼ inch from the surface of the outer covering of neoprene rubber or Viton rubber.

Further objects, features and advantages of the present invention will become apparent from consideration of the following illustration of preferred embodiments.

DETAILED DESCRIPTION OF PREFERRED EMBODIMENTS

Figure 1:
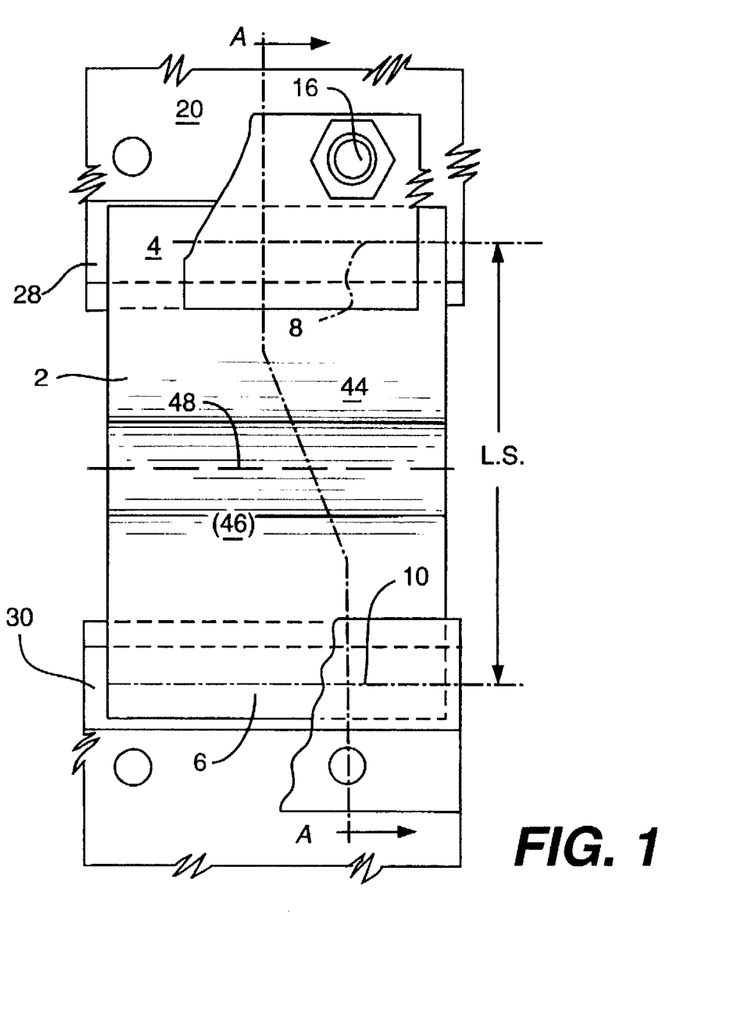
FIG. 1 is a front elevation view showing a portion of an S-shape belt type expansion joint and associated clamp bars, embodying the present invention.

FIG. 1 illustrates, in a front elevation view, a short section of a preferred embodiment for novel dog bone belt 2 being otherwise conventionally mounted so as to define an expansion space between the last stage of a steam turbine and the inlet of a condenser, in a power plant. A first substantially rectangular clamping expansion joint element 20 is field welded transversely to a rectangular duct leading from a steam turbine outlet. The rectangular joint dimensions (not shown) are typically approximately 20 linear feet on each of the four sides, with 12 inch radiused corners between sides. A second substantially rectangular clamping expansion joint element 22 is then welded transversely to a matching duct leading to the condenser inlet. The longitudinal clamp spacing, L.S., is typically about 8⅞ inches, as measured between centerlines of the respective circular raceways of the clamps which are configured by pairs of semicircular surfaces, 24, 28 and 26, 30. Both longitudinal clamp spacing L.S. and any transverse clamp spacing misalignment spacing T.S. are critical dimensions. Ideally, the T.S. dimension is close to zero. The end knobs 4, 6 at each end of belt 2 have center points 8, 10 and are configured to fit tightly in the raceway defining surface sets 24, 28 and 26, 30 of each joint. The web is held substantially unstressed in the longitudinal direction by clamping bars 12, 14 and a plurality of stud assemblies 16, 18 arranged around the rectangular circumference of each opposed expansion joint element 20, 22.

Figure 2:
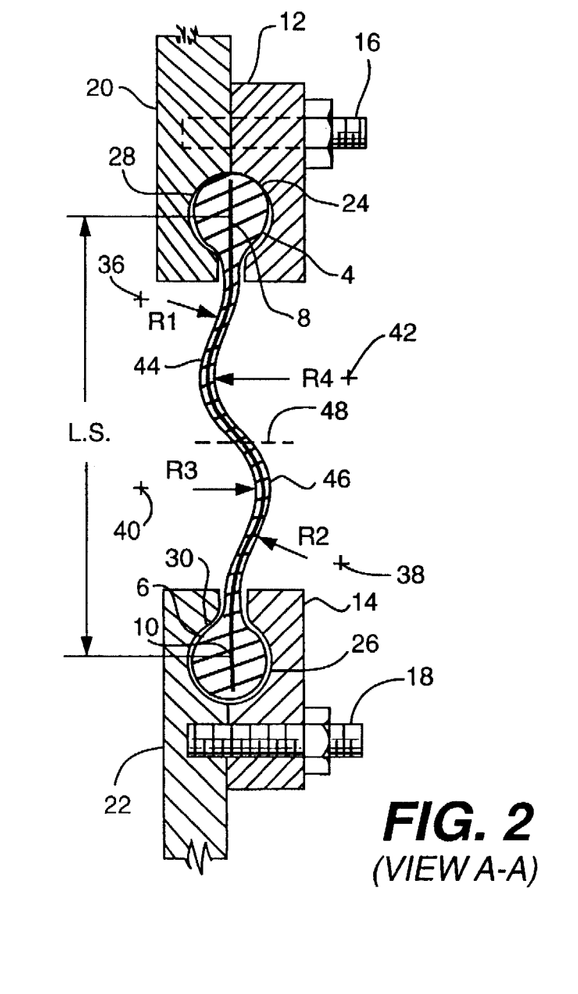
FIG. 2 is side elevation view, in cross-section, taken along line A—A of FIG. 1.

FIG. 2 is a cross-sectional side view taken along section line A—A of FIG. 1, and best illustrates a preferred form of S-shape web, according to the present invention. The S-shape taught herein comprises the same longitudinal clamp spacing dimensions as the intended specification, L.S., for the raceways and the same outer diameters at each of the end knobs 4, 6 as in the OEM belt to be replaced. A first concave wall surface 28, cooperates with the clamp bar recess surface 24 to define a conventional cylindrical cavity as a raceway that typically is approximately 1¼ inches in diameter, and the same geometry exists for the cavity diameter defined as a raceway by a second clamp bar recess surface 26, and an associated second concave wall recess surface 30. However, instead of a flat web extending between the end knobs, a specially curved, constant thickness web is employed that initially was overmolded over a fabric web carcass 32 and then vulcanized to have a uniform durometer along its surface.

Figure 5:
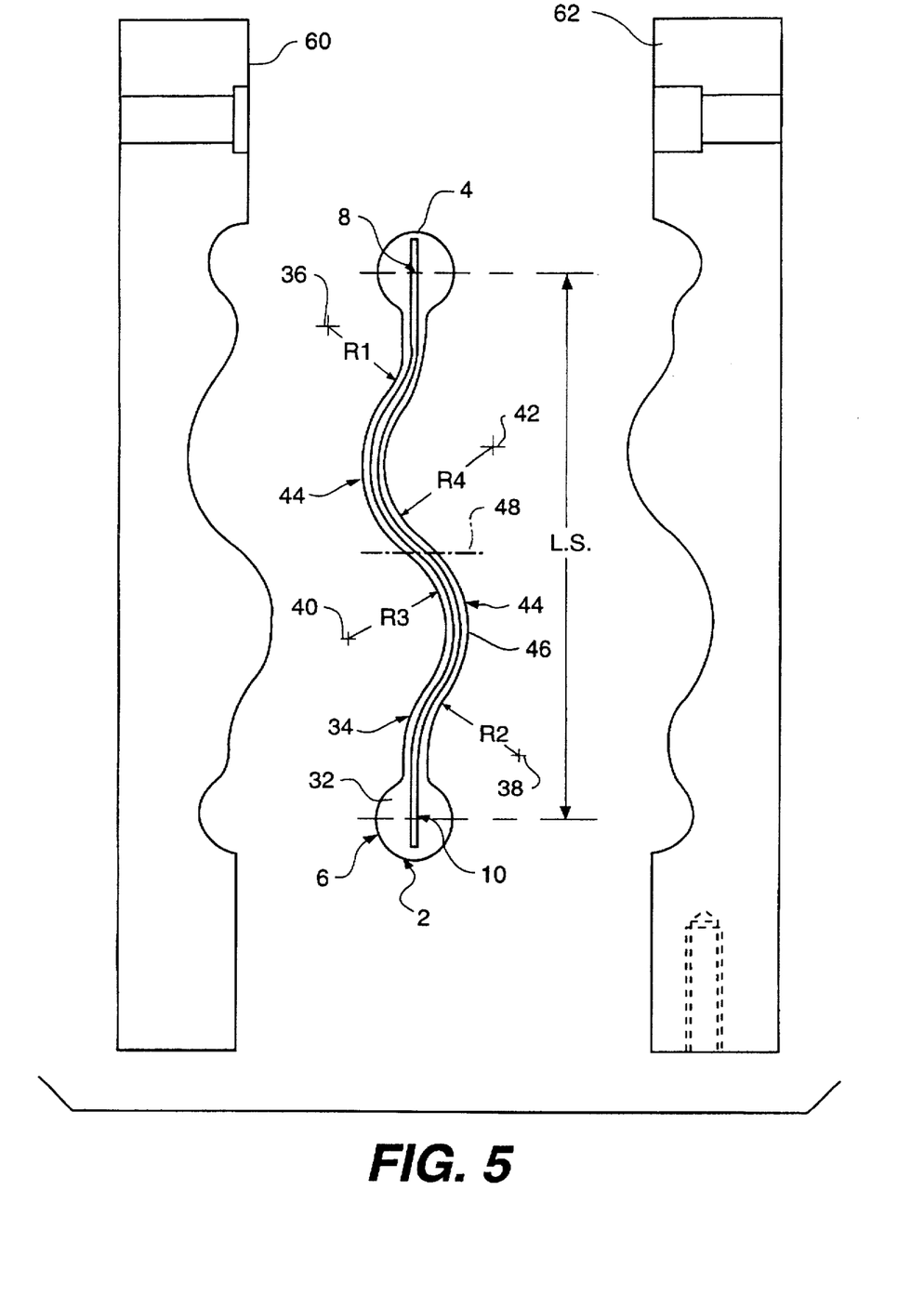
FIG. 5 is a side elevation view, in a cross-section and explosion view, showing an S-shape belt type expansion joint and an associated molding apparatus, embodying the present invention.

A preferred molding technique for creating the S-shape web according to the present invention is illustrated schematically in FIG. 5. The specially molded S-shape in this preferred embodiment is defined through use of two sets of radii of curvature, R1, R2 and R3, R4 as shown in FIGS. 2 and 5 and has a constant thickness dimension 34. The S-shape also can be characterized as having a first concave portion 44 and an opposed second concave portion 46 with respect to a longitudinal centerpoint 48. The first set of radii of curvature R1, R2 preferably have equal radii of 1⅜ inches with each radius established from respective first center points 36, 38 that are about 1⅛ inches longitudinally from the center point of the knob and about 1 9/16 inches tranversely from the center line between the two end knobs, 8, 10. Those first center points 36, 38 for the equal radii of curvature defining the first set are on opposite sides of the web, 2, as illustrated. The second set of radii of curvature R3, R4 preferably also have equal radii of 1½ inches, with each radius established from respective second center points 40, 42 that are about 3 1/16 inches longitudinally from the center points 8, 10 of the knob and about 1 inch transversely from a center line drawn between the center points 8, 10 of the two end knobs, as illustrated. Each second center point 40, 42 for the two radii of curvature defining the second set is on an opposite sides of the web, 2, as illustrated, and each second center point 40, 42 also is opposite to that side where the nearest first center point 36, 38 of the first set is located.

A set of opposed mold elements 60, 62 also are illustrated schematically in FIG. 5 to illustrate a preferred technique for forming an S-shape web according to the present invention. A multi-ply fabric web carcass 32 is positioned within the cavities between mold halves 60, 62 and then overmolded with neoprene or other rubber materials as conventionally used in OEM webs. In FIG. 5 a preferred three ply core 32 of neoprene covered fabric is illustrated with distal ends that are located just inside the outer wall surfaces of each end knob 4, 6. This geometry of rubber coated fabric plies placed in an essentially linear manner as a core along the entire length of the web has proven to simplify the overmolding step, while still creating an S-shape web with suprising tensile strength, despite the lack of any key or hard central rope element as typically used to act as an anchoring mechanism inside of a knob end. As part of the overmolding operation, the thusly-defined web is conventionally heat treated so as to vulcanize the S-shape outer surfaces and create a uniform durometer hardness along both sides of the web.

Figure 7:
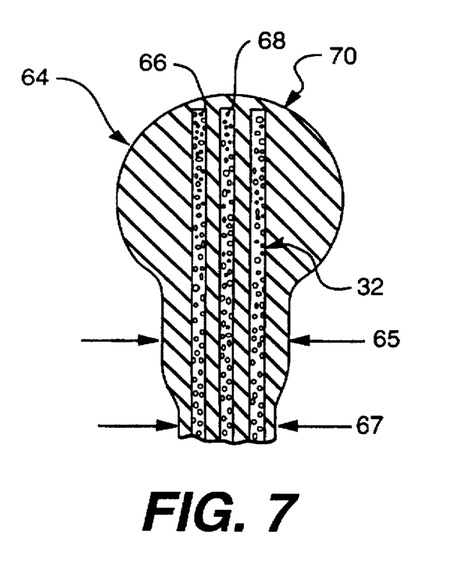
FIG. 7 is a schematic, side elevation view of a first end knob embodiment, in cross-section, showing three fabric plies extending longitudinally within the web and inside of the end knobs, with distal ends proximate the outer surface of the knobs.

The foregoing preferred dimensions are for a nominal constant web dimension 34 of about ⅜ inch and the stated dimensions reference to the locii of curvature for points defining the outer surface of the web facing each center of curvature. With this geometry there is a mirror image symmetry at a longitudinal mid point 48 between the first and second end knobs 4, 6 and, therefore when installed, a mirror image symmetry also between the first and second clamping bar assemblies 12, 14. With such dimensions, the web 2 will be in an S-shape when unstressed and longer in fact than the flat web in an OEM belt having the same, nominal longitudinal dimensions of 10⅛ inches overall, and an L.S. dimension of 8⅞ inches between center points 8, 10 of the end knobs. While a constant thickness dimension of about ⅜ inches is illustrated in FIGS. 2 and 5, it should be appreciated that variable or sections of varying web thicknesses are contemplated as consistent with the scope of the invention. As shown in FIG. 7, a thicker web thickness section, for example nominally ⅝ inches, may be provided just below each end knob if the OEM belt to be replaced had a web dimension of nominally ⅝ inches, and the clamping bars 12, 14 were sized to engage against such a thickness. Studs with bolts 16, 18, typically are used to hold the illustrated clamp bars, and work without modification in the present invention.

Figure 3:
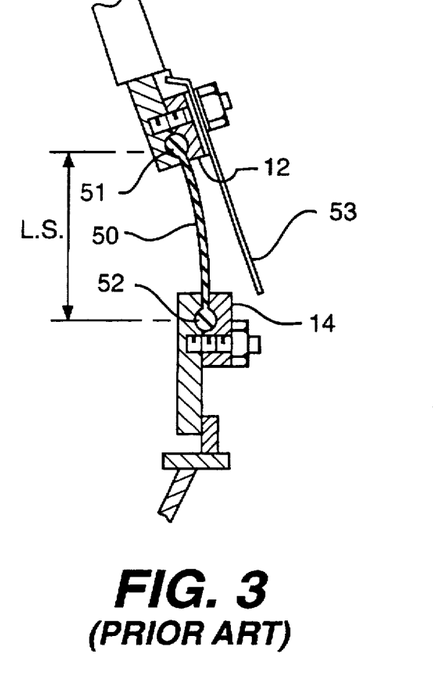
FIG. 3 is a side elevation view, in cross-section, showing a prior art belt type expansion joint in a C-shape buckling mode due to a first misalignment situation.
Figure 4:
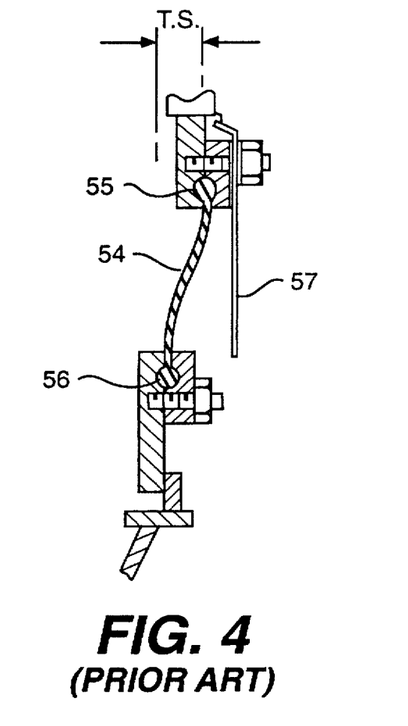
FIG. 4 is a side elevation view, in cross-section, showing a prior art belt type expansion joint in a C-shape buckling mode due to a second misalignment situation.

The S-shape web section shown in FIGS. 2 and 5 essentially creates a second and preferred buckling mode, that permits good cycle life despite a web design that provides significantly more flexibility to the web than was present in the replaced OEM belt. The S-shape web section also greatly improves the sealing and flexing capability of the belt inside where there are off-specification field conditions between the two clamping elements of the expansion joint. The S-shape web illustrated accomodates expansion joint clamp spacing that is out of specification up to about +1 inch and −1 inch in longitudinal spacing or L.S. as illustrated in FIGS. 1, 2, and 3 and also up to about +1 inch and −1 inch in transverse misalignment, or T.S. as illustrated in FIG. 4. OEM belts Only will accommodate expansion joint clamp spacing that is out of specification less than about +⅛ inch and less than about −1 inch in longitudinal spacing and up to about +¼ inch or −¼ inch in transverse misalignment.

FIGS. 3 and 4 illustrate two types of prior art installation problems, and a first or C-mode of buckling whenever a flat web is compressed longitudinally. FIG.. 3 is a side elevation view, in cross-section, showing an OEM belt in a C-shape buckling mode due to a first misalignment situation, where the clamping space is less than the specification due to a warping of one joint element from improper welding technique, for example. FIG. 4 is a side elevation view, in cross-section, showing a prior art belt type expansion joint in another variation of a C-shape buckling mode due to a second misalignment situation where the clamping space also is less than the specification due to a longitudinal and transverse misalignment of one joint element from the other, also typically due to improper welding, for example. Both such out of specification longitudinal compressions impose serious initial stresses upon the mid-span region of an OEM web, and also subject the mid-span region to the greatest stresses due to thermal cycling.

In FIG. 3, an OEM belt 50 with a first edge bead 51, and a second edge bead 52, is in a condition likely to cause a poor seal between each of the bead edges and its surrounding clamping bar. A FIG. 3 misalignment is likely to cause only a line contact between the clamp bar 12 and the first edge bead 51, making it likely that air will enter into the interior of the fluid flow path, to mix with steam, which is flowing at high velocity just inside the conventional metal liner, 53. A metal liner is conventionally present, but has been left out from FIGS. I and 2 for clarity. Such an initial bow, when coupled with normal thermal cycling, also tends to cause premature failure of the belt in the vicinity of greatest flexure of the belt central portion; typically on the convex inner surface region near the midpoint of belt 50, and facing the metal liner 57.

FIG. 4 illustrates a second form of misalignment wherein a conventional OEM belt 54, with a first edge bead 55 and a second edge bead 56, is also in a bowed inward condition due to an excess transverse displacement. Such an initial bow, when coupled with normal thermal cycling, tends to cause premature failure of the belt in the vicinity of greatest flexure of the belt central portion; typically on the convex to concave transition on the inner surface region, near the midpoint of belt 54, which faces the metal liner.

It is well known that an OEM belt cannot really accommodate any amount of longitudinal extension, during or after installation, so that a too wide clamping space (more than +⅛ inch) typically requires rewelding of the expansion joint elements, or modification of the clamps.

It is not apparent to one of ordinary skill that the field problems schematically illustrated in FIGS. 3 and 4 inherently will be less serious if an S-shape design, as illustrated by FIGS. 1, 2 and 5, is substituted. However, using finite element computer modeling, the inventors have confirmed suprising advantages from buckling a pre-formed S-shape web, as taught herein, as compared to the C-shape buckling web, that necessarily results from any degree of longitudinal compression of a flat web, with or without the further problem of transverse misalignment.

Figure 6:
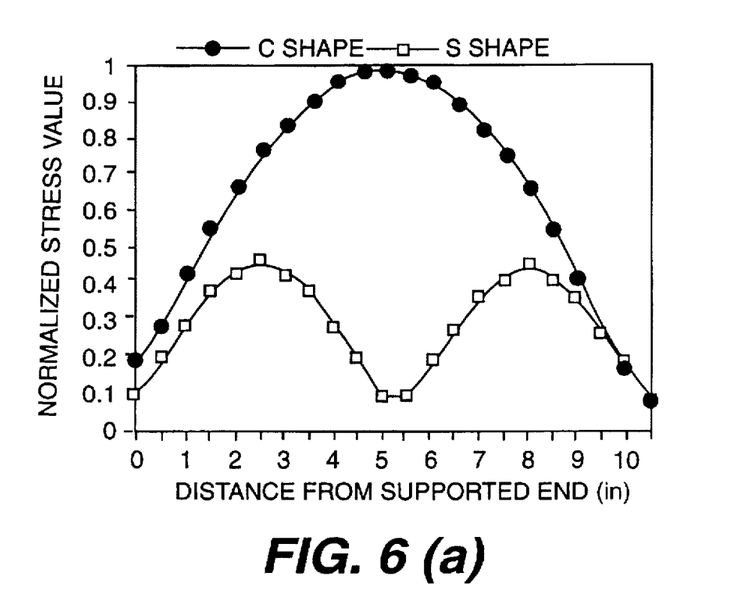
FIG. 6A is a graphical representation of expected bending stress levels, using a finite element computer modeling, comparing a C-shape web model and an S-shape web model, according to the present invention, with the numerical values represented being illustrated in the adjacent FIG. 6B.

To anticipate the effect of initial web shape in an the expansion joint as to fatigue life, a 142 element finite element analysis was utilized on the simplified models of a web as in an expansion joint, using dimensions consistent with a web that had been pre-formed according to the dimensions shown in FIG. 5. Two different shapes having the same inherent rubber material characteristics were considered under equal compressive loading. The results indicated that the maximum stress value in any web portion for an initial "S" shape model was on the order of about 50% less-than the maximum stress value in any web portion for an initial flat web model that assumes a "C" shape. The calculated stress distribution of both models are shown in FIG. 6A. Numerical values used to derive the graph of FIG. 6A are provided in addition, as FIG. 6B.

Predicting the behavior of a material such as neoprene rubber under certain load conditions requires a set of governing equations based on a theory of viscoelasticity. Creep and relaxation are two important characteristics of viscoelastic materials. The results of creep test and relaxation test of a viscoelastic material, observed experimentally, favorably compared to the results of creep and relaxation test of a viscoelastic model as derived analytically. The viscoelastic model and its governing equations are viewed as useful for predicting the behavior of a particular viscoelastic material, such as neoprene rubber.

A confirming of the invention, which was indicated by the analytical modeling, further is illustrated by the following examples involving protype specimens and physical testing to simulate conditions experienced by an OEM belt. The main objective of tensile testing was to determine the ultimate strength of an initial web in a S shape, in contrast to being in an initial C shape. Although an expansion joint belt is not designed for tension (and it will not be exposed to tensile stress under normal power plant conditions) the tensile testing results does confirm the strength of a web design. Tensile tests were performed on each initial S and C shape. The testing involved loading the specimen in tension at a constant rate of 0.1 inch per minute. As the specimen was loaded and at each load step, the magnitude of extension and of relaxation (at approximately 1 minute duration) was observed. Tensile testing results showed a lowest value of ultimate strength of at least 14,000 pounds, for all specimens.

Fatigue testing was considered more appropriate to reproduce the types of stresses experienced by a flat expansion joint web in a power plant environment. Such testing involved repeatedly stressing a web material, relaxing the stress and then stressing the material again. In the field, the expansion joint is stressed in compression and, in some cases, the web is under an initial compressive stress following installation. Cyclic compressive stress was chosen as the fatigue testing method for modified expansion belts, according to the invention.

Several initial S and C shape prototype web specimens first were tested for a duration of 20,000 cycles at room temperature. A specimen initially was compressed about 1 cm from a zero loaded condition. It was further compressed for a total of 3 cm compression and then released to the initial condition. The frequency of the compression cycling was 1 Hz. After 20,000 cycles, none of the specimens showed any signs of fatigue damage, at room temperatures.

Under operational conditions in the power plant, the expansion joint belt will be exposed to temperatures of about 100° F. It is possible that conditions may exist where temperatures higher than this may occur for very short periods. Usually, the high temperature fatigue testing results of samples are dependent upon the material properties of the covering rubber. The same material, neoprene, was used as the covering rubber for all the testing samples. Thus, the same condition fatigue testing will give similar results even on different specimens.

The results of one initially flat specimen, used for fatigue testing run at a temperature of 290° F. for 20,000 cycles, showed visible signs of heat damage to the rubber in the portion that is bent outward (middle section). The specimen was permanently bent into a C shape, and very small cracks were seen at close examination or by bending the specimen further and putting the heat-damaged convex section in tension. In a high temperature fatigue tested specimen, the crack initiated at the middle span of the web, where the maximum bending stress also would occur.

EXAMPLE 1

Four 12"-long flat OEM belt samples, as manufactured by Cambelt International Corporation, of Salt Lake City, Utah were examined. These samples were used in initial tensile testing, room temperature fatigue testing, and high temperature (300° F.) fatigue testing. Four cut sections were placed in grips and .compressed with clamps and, aided by other constraints, forced into initial "S" and "C" configurations. The sections then were placed in a furnace and first kept at a temperature of 200° F. for 27 hours, and then kept at room temperature for 24 hours to create 2 sets of initial "S" and "C" shapes specimens, that then were subjected to tensile and high temperature fatigue testing.

For the first set, both "C" and "S" shape specimens were simultaneously under cyclic compression for 35,000 cycles at room temperature. Both specimens showed no indications of failure. The temperature was increased to 130° F. and fatigue testing continued for another 15,000 cycles. Again, no signs of failure were observed. An additional 15,000 cycles were performed at 180° F. After this test interval, initiation of cracks was visible in the "C" shape sample. However, the "S" shape specimen still showed no signs of failure.

For the second set, the "C" shape specimen was fatigue tested at an unrealistically high temperature of 220° F. After about 6,000 cycles, visible cracks were initiated at the middle section. Next, the "S" shape specimen was fatigue tested at the same high temperature (220° F.). Visible cracks were not initiated until after about 9,000 cycles, which could be read to indicate that simply modifying the same construction of a typical 6 ply web section from a "C" to an "S" shape might increase the fatigue life of a belt by 50%.

EXAMPLE 2

As a further step in the improvements, the number of plies in the web were reduced from 6 plies to 3 plies. These 3 plies initially were bonded together in a wiping step, by thin layers of white neoprene rubber prior to an overmolding with black neoprene rubber. The thickness of the web was made to be consistent with a sample OEM belt having 6 plies of fabric as a web carcass. Hence, there is no doubt that the flexibility of the modified belt would significantly be increased. The adequate strength of such a design, however, would have to be proven experimentally.

EXAMPLE 3

For an end knob configuration, two prior art designs and two novel designs were considered. OEM belts typically have a ⅝" diameter polyethylene cord and a key-lock wedge just below the cord. Alternatively, an oversized key extends arrow-like midway between the six plies and towards the web, by approximately 1 inch.

FIG. 7 is a schematic, side elevation detail view of how the core is terminated ia a preferred embodiment. The knob 64, in cross-section, has a core of three fabric plies extending longitudinally and centrally within the S-shape web, with each distal end of the core being about ¼ inch inside an outer surface of the knob. Each of plies 66, 68, 70 are of 7.5 ounce spun polyester fabric, and together are estimated to contribute about 12,500 pounds in tensile strength. Each fabric ply initially is coated with a white neoprene rubber skim coat. The plies are laid in the mold and extended into the end of each knob without any cord or key-lock wedge, to a distal end that is proximate to the knob outer surface. FIG. 7 also illustrates a thicker web thickness section 65, for example of nominally ⅝ inches, that may be provided as a transition to a web thickness dimension 67 of nominally ⅛ inches. This optional structure just below each end knob allows a novel S-Shape belt with increased flexibility to replace an OEM belt that had a web dimension of nominally ⅝ inches.

Figure 8:
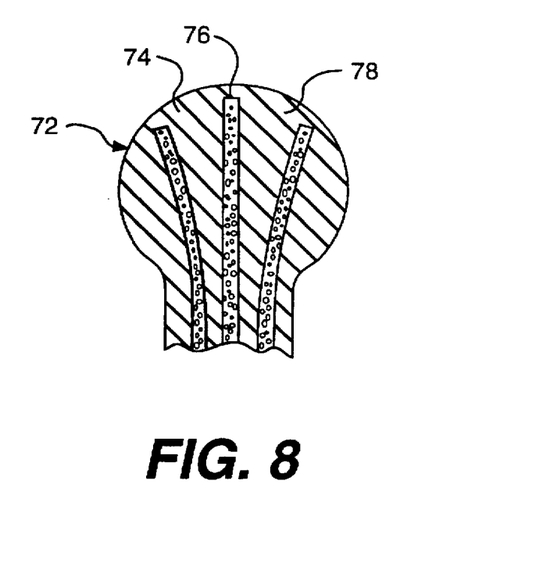
FIG. 8 is a schematic, side elevation view of a second end knob embodiment in cross-section, showing three expanded fabric plies splayed outwardly inside the knob, as a substitute for a key.

FIG. 8 is a schematic, side elevation detail view of a second novel knob embodiment 72, in cross-section, showing a web also comprising three skim coated fabric fabric plies 72, 76, 78 as in FIG. 7, but with distal ends that are splayed outwardly inside, the knob, as a locking mchanism that avoids any need for a central cord inside the knob, or a separate key element between the web and the center of the knob.

Five different types of knob design specimens were created as testing samples by Cambelt. The covering rubber for all the samples was neoprene, but each sample had different fabric lay-up or end configuration.

Tensile testing results showed that none of the samples failed below about 14,000 lbs. The mode of failure of a specimen with a conventional splice involved fibers that frayed and separated at the ends with large spacing between the individual fibers. Black covering neoprene rubber was intact.

Accordingly, the preferred and optimum web carcass design appears to be an expansion joint belt with a 3-ply web, with each fabric ply initially skim coated with neoprene rubber and a knob configuration of the fabric plies extended longitudinally and straight into the knob, with no cord core and no key, as shown in FIG. 7. An alternative has the fabric layers being spread out to define a substitute for a key, as shown in FIG. 8.

Flaws and imperfections during manufacturing will be reduced due to the simplicity of either internal web carcass design. Such a belt inherently is more flexible than an OEM belt with 6 plies and a cord, or a cord together with a key. Therefore, residual stresses due to installation will be reduced. The belt overmolding process is easier and faster, since cords and keys don't have to be accurately centered. Seal capability is improved, since the knob head itself will be more flexible and better able to How against varying surface conditions inside the clamping raceways, because there is no central rope cord of rigid key element to resist a compression of the knob ends inside the circular raceways of the expansion joints. The skim coat on the fabric plies appears to enhance interfacial bonding with the overmolded rubber to such a degree that the need for a cord or a key to resist tensile failures of the belt is eliminated.

While preferred embodiments of our invention have been shown and described, the invention is to be defined by the scope of the appended claims.

We claim:

1. In an expansion joint belt for use between expansion joint elements mounted between wall surfaces subject to longitudinal expansion and contraction, said belt essentially comprising a web portion that is elongated in the longitudinal direction with a first knob at one end and a second knob at the other end, each knob further being adapted to be clamped by a mounting means of said expansion joint elements, the improvement which comprises defining said web portion as an S-shape between said knobs that is defined by a curved web that initially is molded using a first set of two radii of curvature located on opposite sides of said curved web proximate to said knobs at each end of said curved web and a second set of two radii of curvature located on opposite sides of said curved web proximate to a center section of said curved web.

2. An improved expansion joint belt according to claim 1, wherein both radii of said first set of two radii of curvature are substantially equal to each other, and each radius in that set has a center point that is proximate to one of the two knobs, is transversely spaced from a center line between the two knobs, and is on opposite sides of said web.

3. An improved expansion joint belt according to claim 1, wherein both radii of said second set of two radii of curvature are substantially equal to each other, and each radius in that set has a center point that is proximate to a center section of the web, is transversely spaced from a center line between the two knobs, and is on opposite sides of said web.

4. An improved expansion joint belt according to claim 1, wherein said belt has a longitudinal plane of symmetry, and center points for each radius of curvature defining the first set of two radii of curvature are symmetrical with respect to said knobs and transversely spaced from a center line between the two knobs.

5. An improved expansion joint belt according to claim 4, wherein said first set of two radii of curvature are substantially equal and each radius in that set has a center point proximate to one of the knobs and on an opposite side of said web and said second set of two radii of curvature are substantially equal and each radius in that set has a center proximate to a center section and on an opposite side of said web.

6. An improved expansion joint belt according to claim 5, wherein said web has a substantially constant thickness between said knobs, and each radius in the second set has said center proximate to and symmetrical with said center section and also on an opposite side of said web with respect to an adjacent center point for a radius of curvature in the first set.

7. An improved expansion joint belt according to claim 1, wherein said belt has a longitudinal plane of symmetry, and center points for each radius of curvature defining the second set of two radii of curvature are symmetrical with respect to to a center section of the web and transversely spaced from a center line between the two knobs.

8. An improved expansion joint belt according to claim 7, wherein said first set of two radii of curvature are substantially equal and each radius in that set has a center point proximate to one of the two knobs and on an opposite side of said web and said second set of two radii of curvature are substantially equal and each radius in that set has a center proximate to a center section and on an opposite side of said web.

9. An improved expansion joint belt according to claim 8, wherein said web has a substantially constant thickness between said knobs, and each radius in the first set has a center proximate to and symmetrical with one of the two knobs and also on an opposite side of said web with respect to an adjacent center point for a radius of curvature in the second set.

10. An expansion joint belt according to claim 1, wherein said first set of two radii of curvature are substantially equal, said second set of two radii of curvature are substantially equal, the radii of the first set are smaller than the radii of said second set, and the center points for the radii of curvature defining the first and second sets of radii are substantially symmetrical with respect to both a center section of said web and a centerline between the two knobs.

* * * * *